(12) United States Patent
Parks (10) Patent No.: US 7,891,179 B2
(45) Date of Patent: Feb. 22, 2011

(54) RADIALLY COMPLIANT PUMP HUB

(75) Inventor: Kevin Parks, Wooster, OH (US)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 368 days.

(21) Appl. No.: 12/070,022

(22) Filed: Feb. 14, 2008

(65) Prior Publication Data

US 2008/0202879 A1  Aug. 28, 2008

Related U.S. Application Data

(60) Provisional application No. 60/904,010, filed on Feb. 28, 2007.

(51) Int. Cl.
*F16H 41/24* (2006.01)
*F03B 3/02* (2006.01)

(52) U.S. Cl. .......................... 60/364; 60/330

(58) Field of Classification Search .......... 60/330, 60/358, 364; 416/180, 197 C
See application file for complete search history.

(56) References Cited

U.S. PATENT DOCUMENTS

| 2,745,354 | A | * | 5/1956 | English et al. ................. 60/367 |
| 4,059,365 | A | | 11/1977 | Ivey et al. |
| 5,988,981 | A | * | 11/1999 | Dehrmann et al. ...... 416/197 C |
| 7,290,987 | B1 | * | 11/2007 | Morin ..................... 416/197 C |
| 2007/0142174 | A1 | | 6/2007 | Swank et al. |
| 2008/0008524 | A1 | | 1/2008 | Smith et al. |

FOREIGN PATENT DOCUMENTS

GB       1440134 A  *  6/1976

* cited by examiner

*Primary Examiner*—Thomas E Lazo
(74) *Attorney, Agent, or Firm*—Simpson & Simpson, PLLC (57) ABSTRACT

A pump assembly for a torque converter including a shell arranged to receive a plurality of blades for the pump, a hub arranged to interface with a transmission, and a resilient member located axially between an annular portion of the shell and annular portion of the hub. In a preferred embodiment, the resilient member is an O-ring.

11 Claims, 11 Drawing Sheets

RADIALLY COMPLIANT PUMP HUB

CROSS-REFERENCE TO RELATED APPLICATIONS

This application claims the benefit under 35 U.S.C. §119(e) of U.S. Provisional Application No. 60/904,010, filed Feb. 28, 2007, which application is incorporated herein by reference.

FIELD OF THE INVENTION

The invention relates to improvements in apparatus for transmitting force. The force can be between a rotary driving unit (such as the engine of a motor vehicle) and a rotary driven unit (such as the variable-speed transmission in the motor vehicle), or the force can be transmitted within a rotary driving unit (such as the transmission of a motor vehicle). In particular, the invention relates to a radially compliant pump hub.

BACKGROUND OF THE INVENTION

Figure 1:
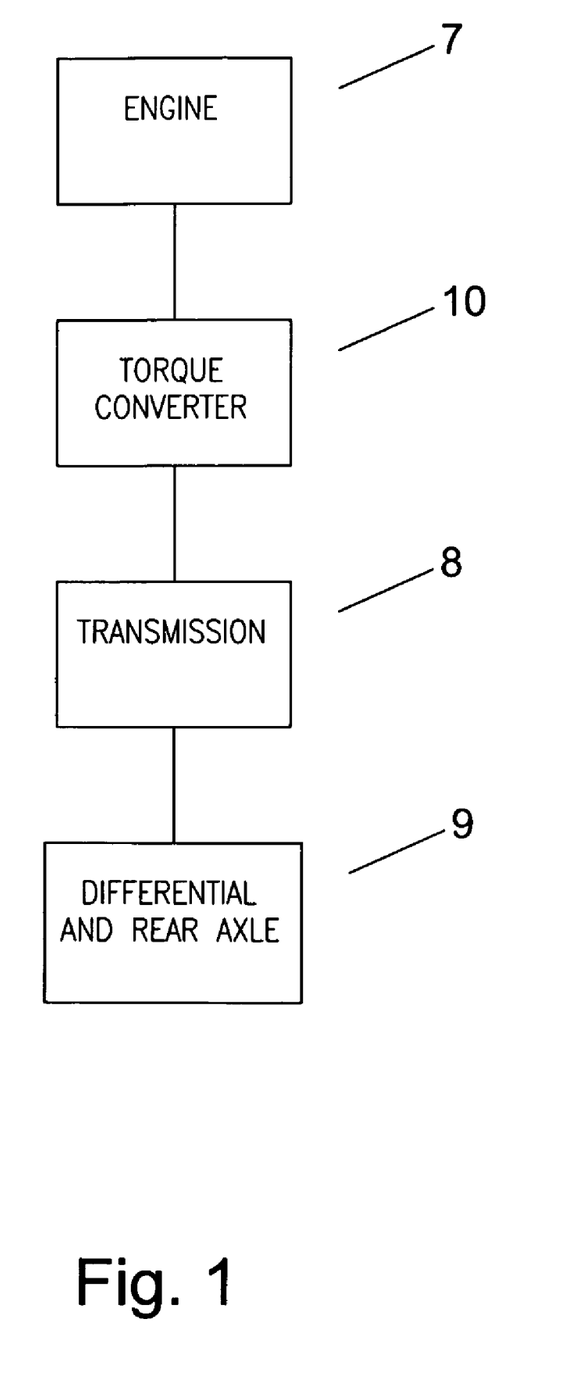
FIG. 1 is a general block diagram illustration of power flow in a motor vehicle, intended to help explain the relationship and function of a torque converter in the drive train thereof.

FIG. 1 illustrates a general block diagram showing the relationship of the engine 7, torque converter 10, transmission 8, and differential/axle assembly 9 in a typical vehicle. It is well known that a torque converter is used to transmit torque from an engine to a transmission of a motor vehicle.

Figure 2:
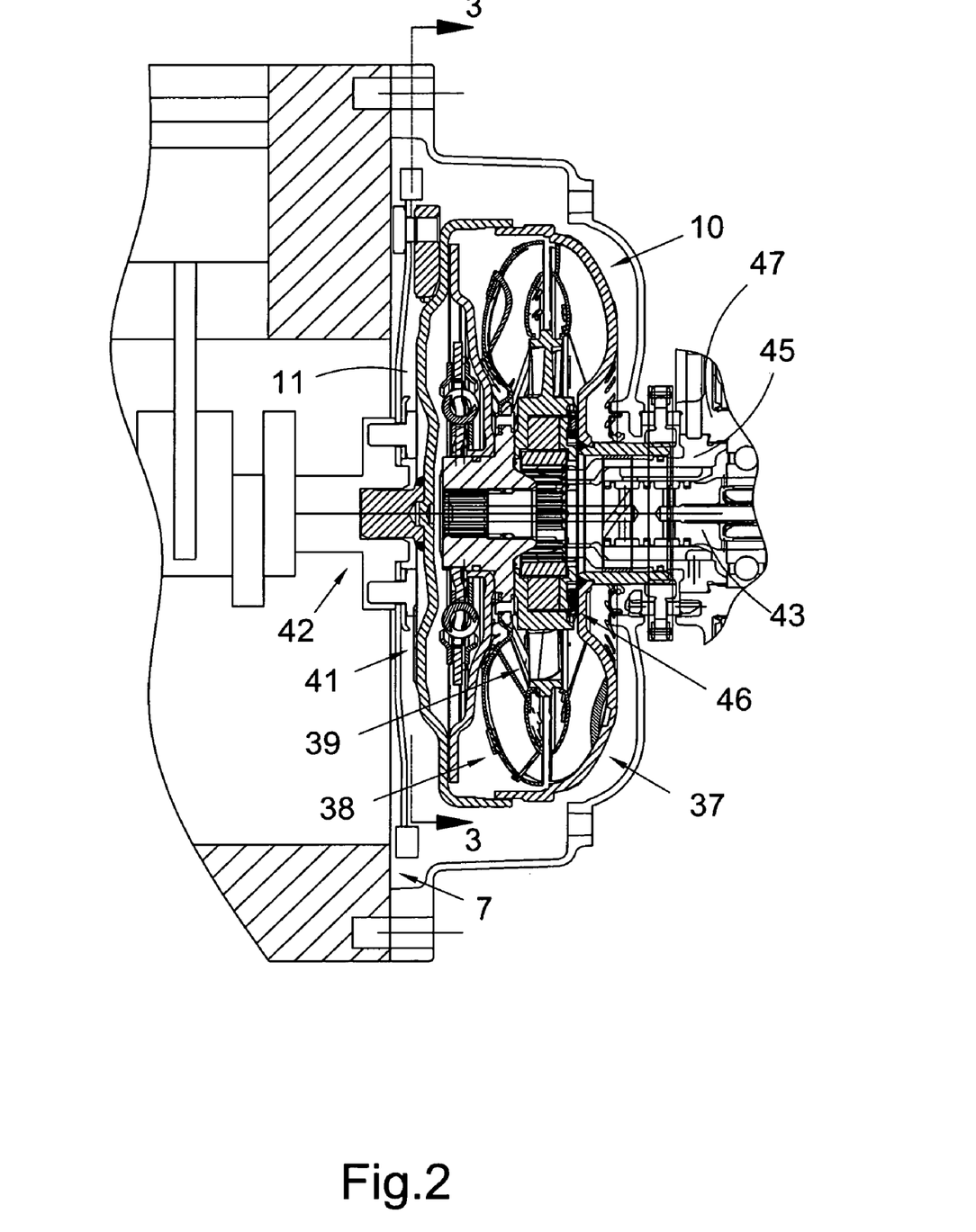
FIG. 2 is a cross-sectional view of a prior art torque converter, shown secured to an engine of a motor vehicle.
Figure 3:
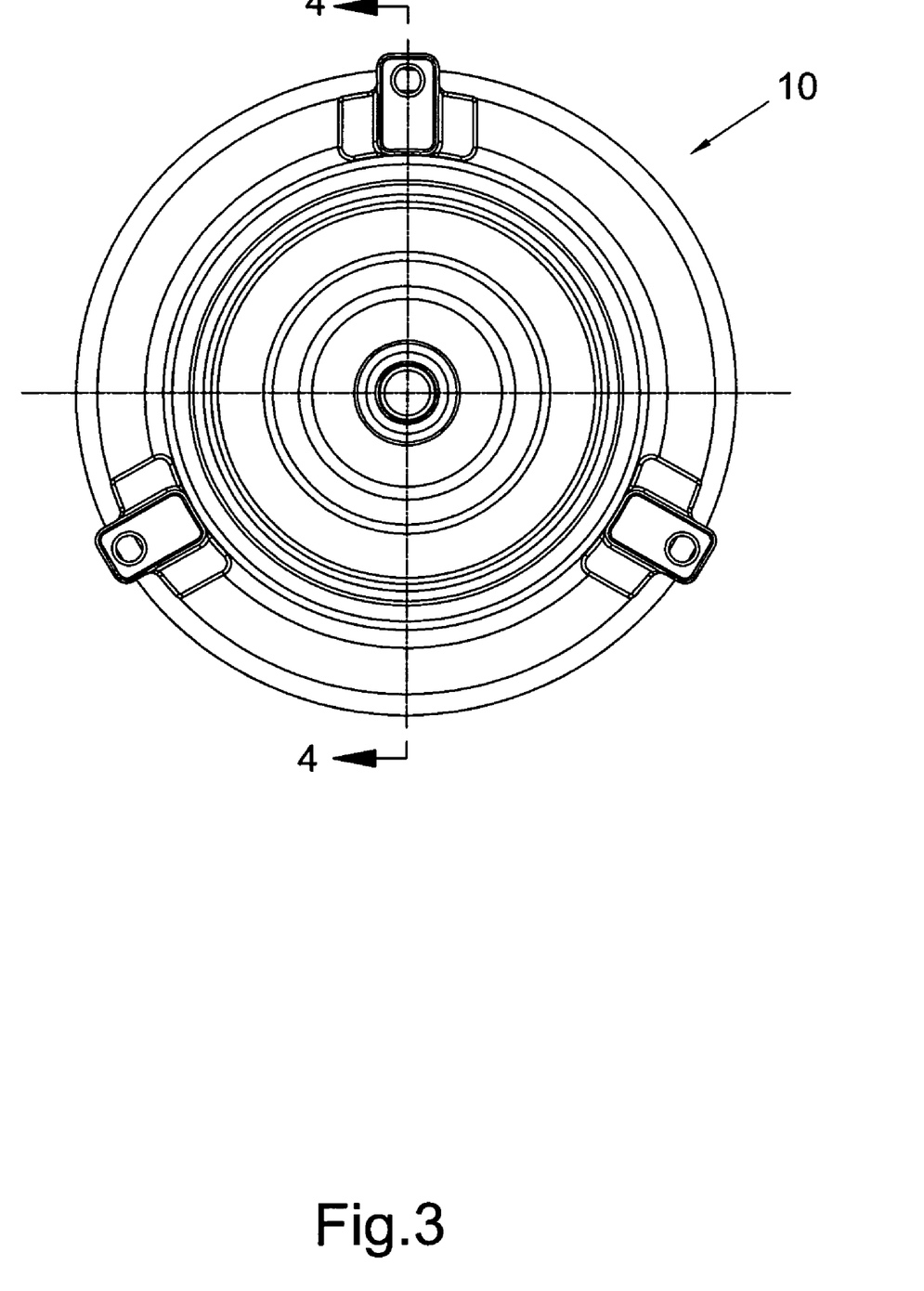
FIG. 3 is a left view of the torque converter shown in FIG. 2, taken generally along line 3-3 in FIG. 2.
Figure 4:
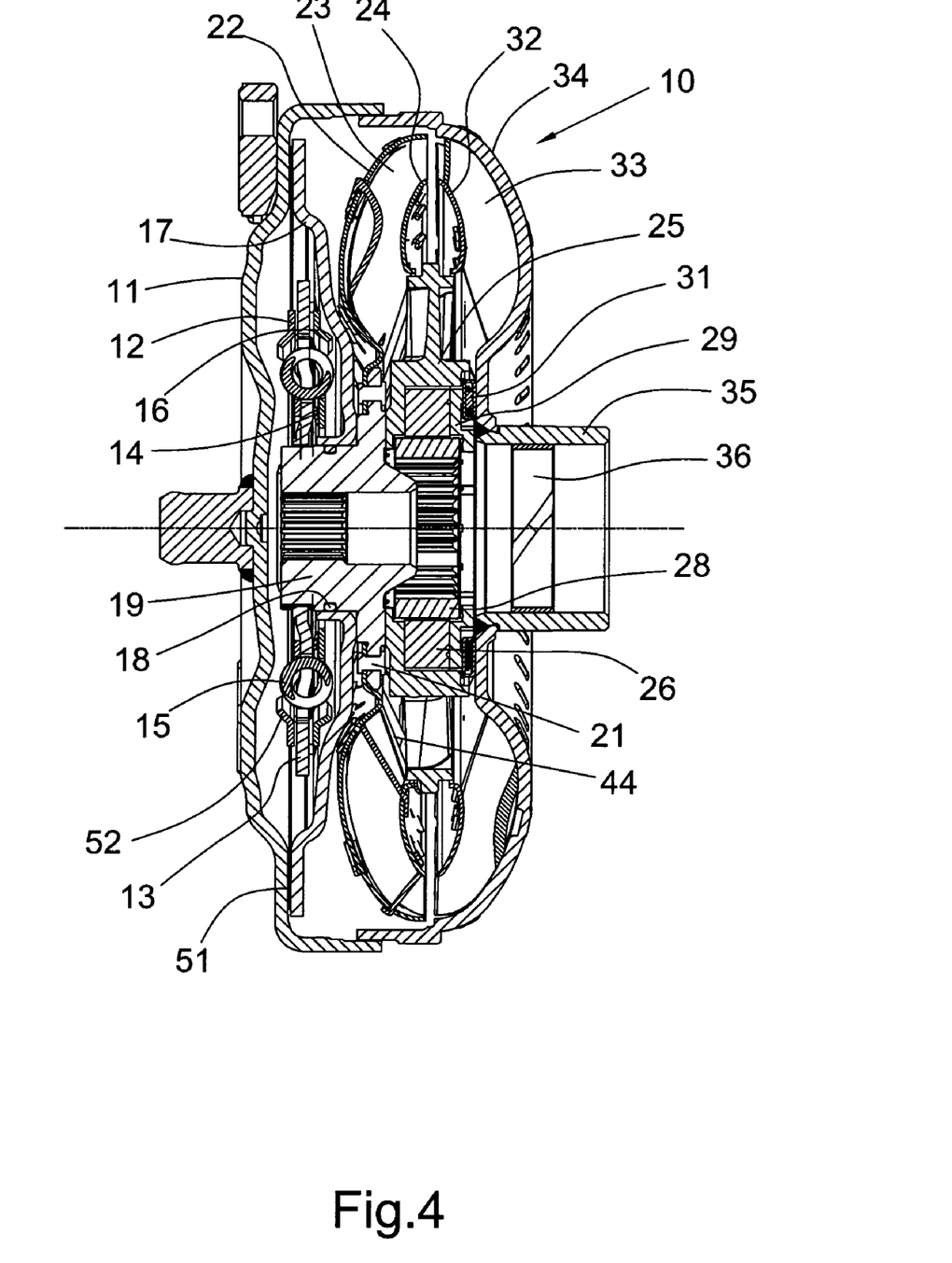
FIG. 4 is a cross-sectional view of the torque converter shown in FIGS. 2 and 3, taken generally along line 4-4 in FIG. 3.
Figure 5:
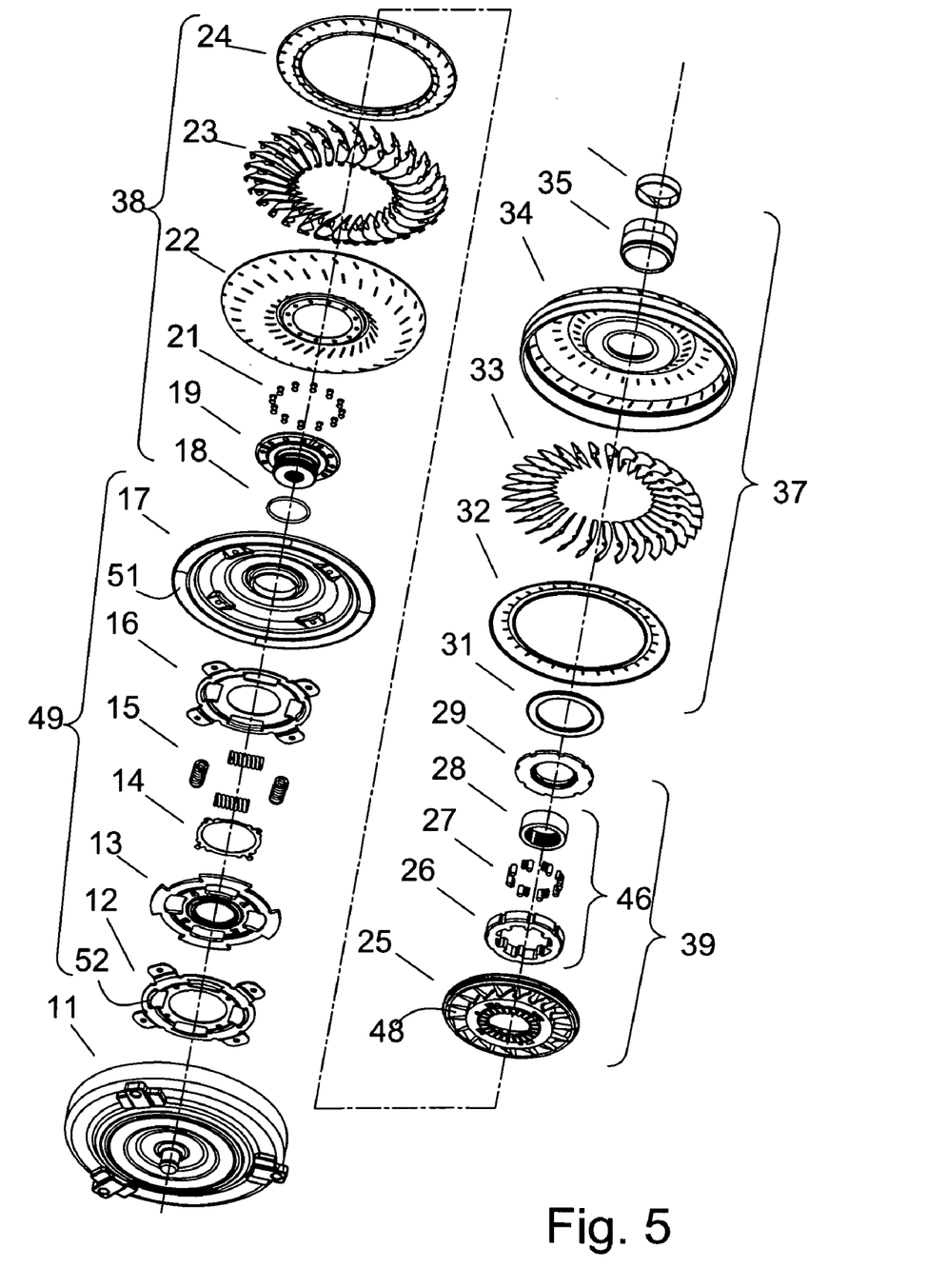
FIG. 5 is a first exploded view of the torque converter shown in FIG. 2, as shown from the perspective of one viewing the exploded torque converter from the left.
Figure 6:
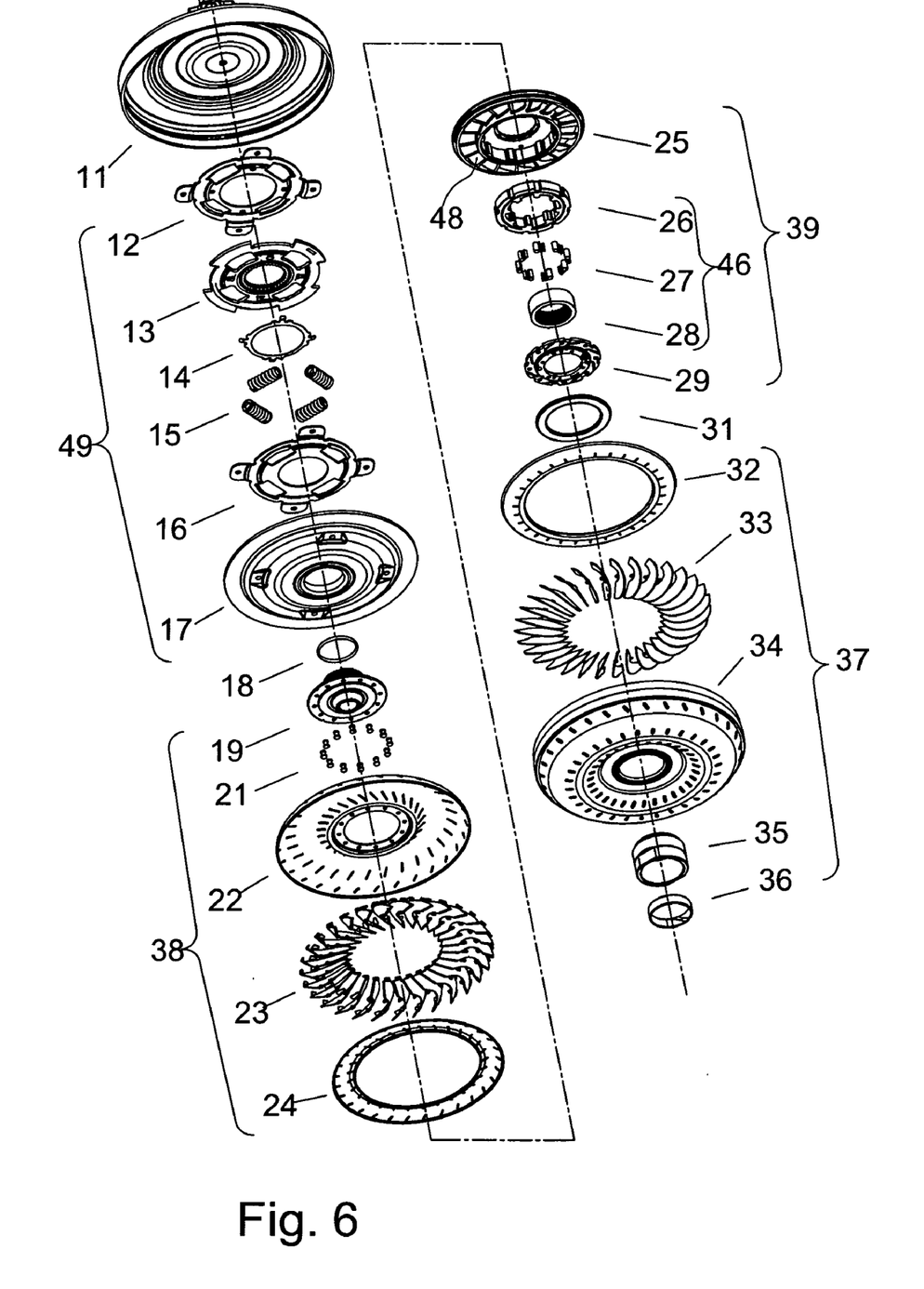
FIG. 6 is a second exploded view of the torque converter shown in FIG. 2, as shown from the perspective of one viewing the exploded torque converter from the right.

The three main components of the torque converter are the pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

In torque converter 10 a fluid circuit is created by the pump (sometimes called an impeller), the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2. This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48 to enter pump 37 in the direction of rotation.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At speed ratios less than 1, the torque converter is less than 100% efficient. The torque ratio of the torque converter gradually reduces from a high of about 1.8 to 2.2, to a torque ratio of about 1 as the turbine rotational speed approaches the pump rotational speed. The speed ratio when the torque ratio reaches 1 is called the coupling point. At this point, the fluid entering the stator no longer needs redirected, and the one way clutch in the stator allows it to rotate in the same direction as the pump and turbine. Because the stator is not redirecting the fluid, torque output from the torque converter is the same as torque input. The entire fluid circuit will rotate as a unit.

Peak torque converter efficiency is limited to 92-93% based on losses in the fluid. Therefore torque converter clutch 49 is employed to mechanically connect the torque converter input to the output, improving efficiency to 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series with engine 7 and transmission 8 to lower the effective spring rate of the system, thereby lowering the natural frequency.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis.

Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

Pump hub 35 is arranged to interface with the transmission. Normally, pump hub 35 is rigidly attached to pump shell 34, i.e., by welding. Bushing 36 allows differing rotational speeds between torque converter 10 and stator shaft 47. In some designs, bushing 36 also centers pump side of torque converter 10 relative to the transmission (not shown). Flexplate 53 is required to compensate for misalignment between the engine and transmission because torque converter 10 is centered on engine side by cover pilot 54 and on transmission side by pump hub 35.

Pump hub 35 is arranged to transmit torque to the transmission pump (not shown). Pump hub 35 may use features including flats, notches, or tabs to transmit torque. These features must be robustly designed to prevent failure caused by torque spikes between the engine and transmission pump because pump hub 35 is rigidly attached to pump shell 34.

Thus, there is a long-felt need for a torque converter pump incorporating a hub connection method that compensates for misalignment between the engine and transmission. Furthermore, there is a need for a torque converter pump incorporating a non-rigid hub connection method to limit torque spikes transmitted to the torque transmission features of the pump hub.

BRIEF SUMMARY OF THE INVENTION

The invention broadly comprises a pump assembly for a torque converter including a shell arranged to receive a plurality of blades for the pump, a hub arranged to interface with a transmission, and a resilient member located axially between an annular portion of the shell and annular portion of the hub. In a preferred embodiment, the resilient member is an O-ring.

In a preferred embodiment, the pump hub includes means for rotating a hydraulic pump in the transmission. In one embodiment, the means is a notch or a flattened portion of the hub.

In a preferred embodiment, the pump includes a means for compressing the resilient member. In another preferred embodiment, the resilient member is an O-ring and the compressing means is a speed nut. In some aspects, the pump shell, pump hub, or both includes a circumferential groove for receiving the O-ring.

The invention also broadly comprises a torque converter including a pump shell arranged to receive a plurality of blades, a hub arranged to interface with a transmission, and a frictional connection between the shell and the hub. In a preferred embodiment, the torque converter also includes a cover connected to the pump shell and the torque capacity of the connection between the pump shell and the cover is greater than the torque capacity of the frictional connection.

In another preferred embodiment, the hub is radially displaceable in relation to the pump shell.

The invention also broadly comprises a method for assembling a pump hub to a pump shell comprising positioning a resilient member between the pump hub and the pump shell and compressing the resilient member between the pump hub and the pump shell. In a preferred embodiment, compressing the resilient member between the pump hub and the pump shell includes retaining the hub with respect to the shell.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 7A:
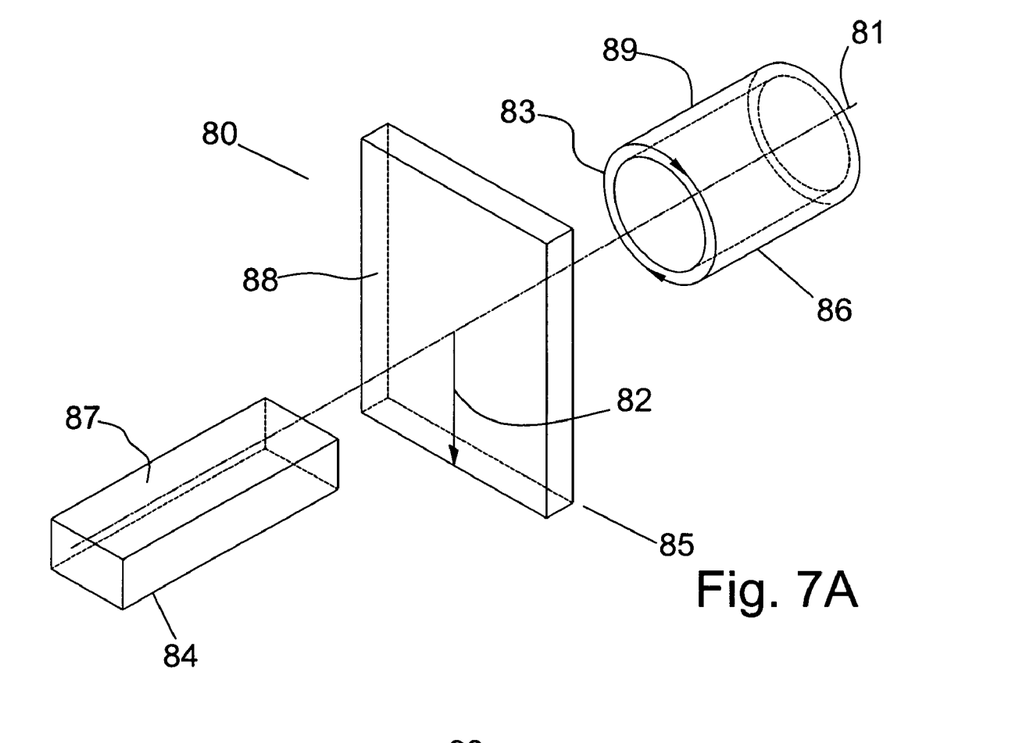
FIG. 7A is a perspective view of a cylindrical coordinate system demonstrating spatial terminology used in the present application.

FIG. 7A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also refer to orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are used with respect to an orientation parallel to axis 81, radius 82, or circumference 83, respectively. The adverbs "axially," "radially," and "circumferentially" also are regarding orientation parallel to respective planes.

Figure 7B:
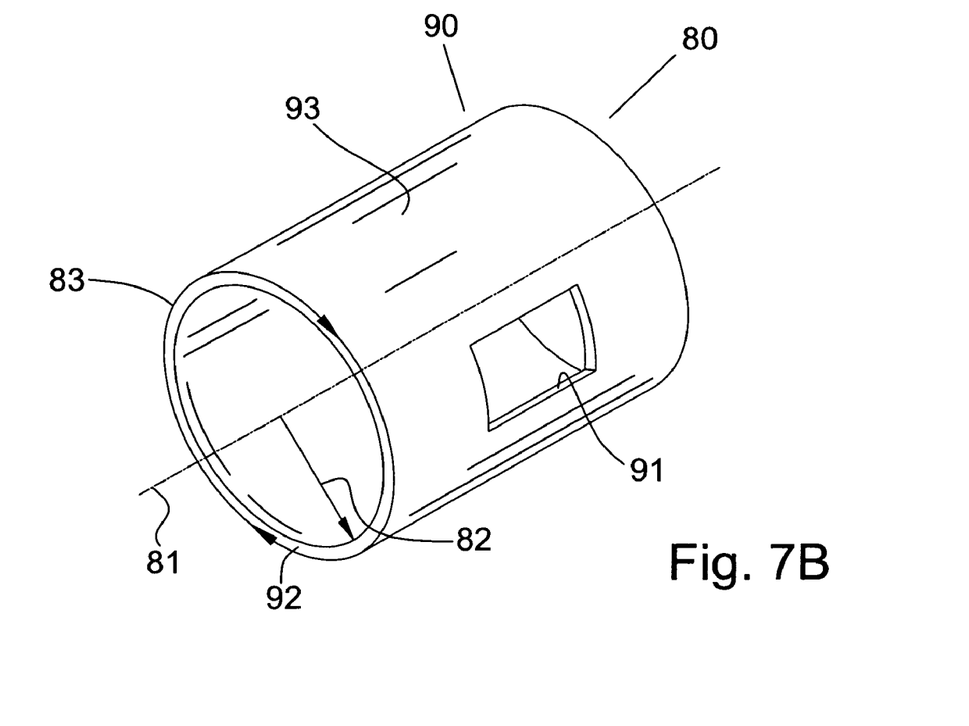
FIG. 7B is a perspective view of an object in the cylindrical coordinate system of FIG. 7A demonstrating spatial terminology used in the present application.

FIG. 7B is a perspective view of object 90 in cylindrical coordinate system 80 of FIG. 7A demonstrating spatial terminology used in the present application. Cylindrical object 90 is representative of a cylindrical object in a cylindrical coordinate system and is not intended to limit the present invention is any manner. Object 90 includes axial surface 91, radial surface 92, and circumferential surface 93. Surface 91 is part of an axial plane, surface 92 is part of a radial plane, and surface 93 is part of a circumferential plane.

Figure 8:
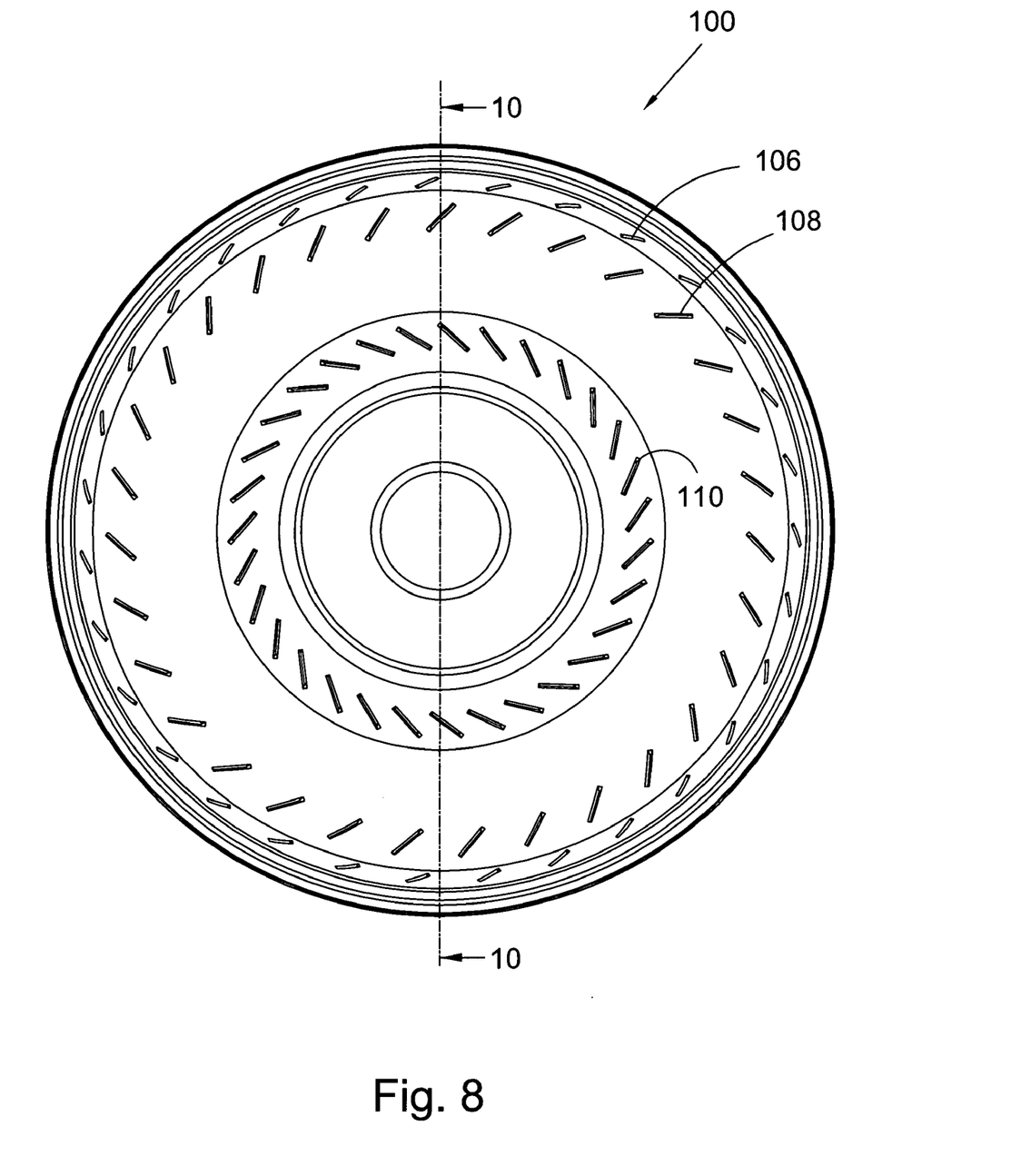
FIG. 8 is a front view of a present invention torque converter pump shown with the blades removed for clarity.
Figure 9:
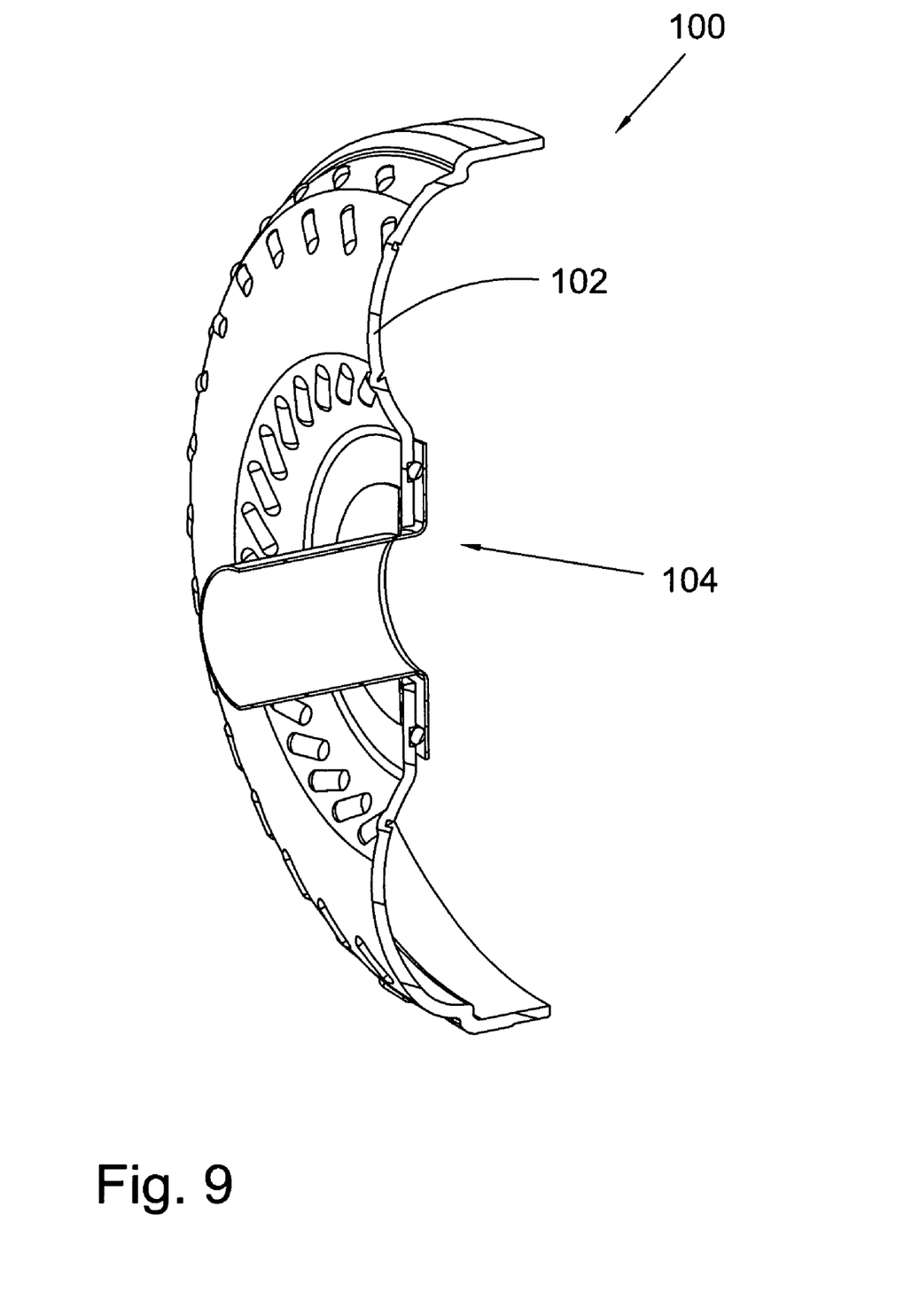
FIG. 9 is a sectioned perspective view of the torque converter pump shown in FIG. 8.
Figure 10:
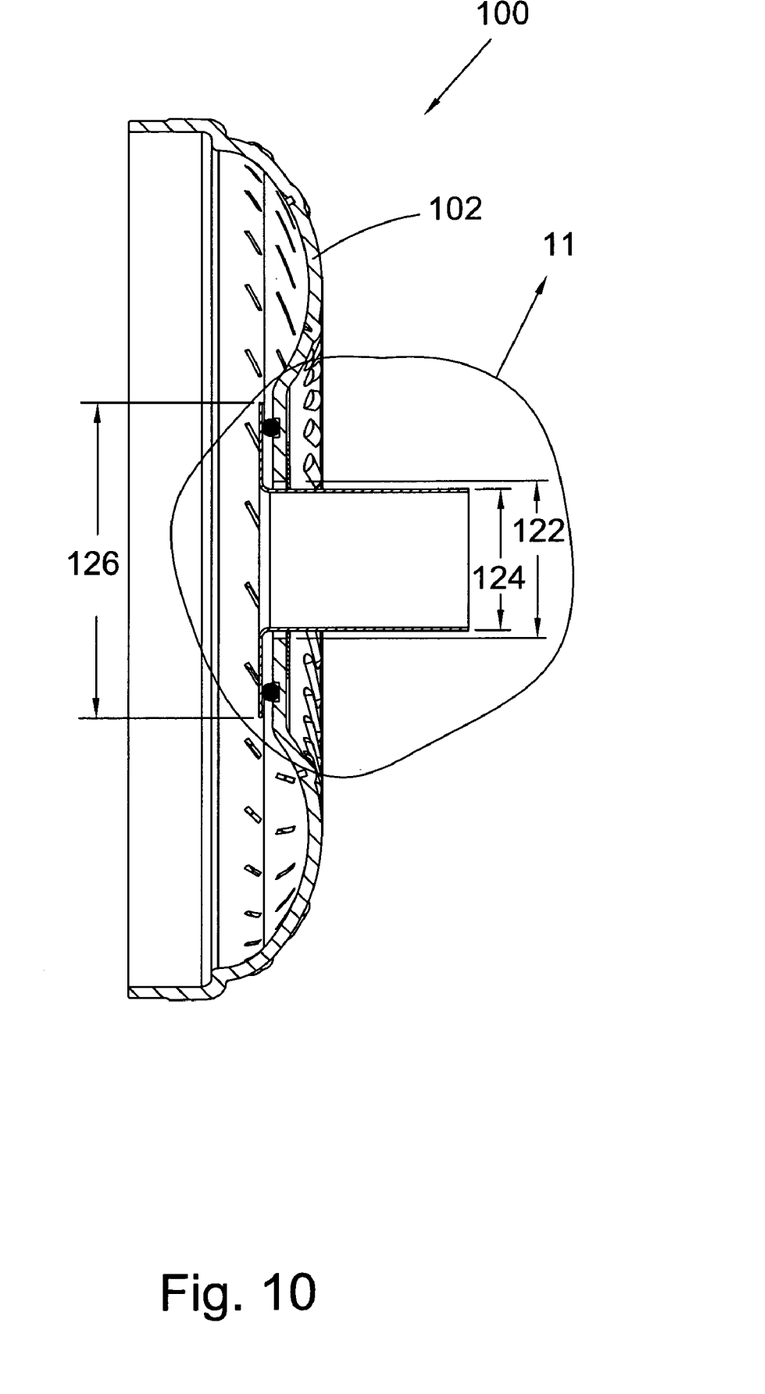
FIG. 10 is a section view of the torque converter pump shown in FIG. 8 taken generally along line 10-10 in FIG. 8; and, FIG. 11 is a detail view of encircled region 11 in FIG. 10.
Figure 11:
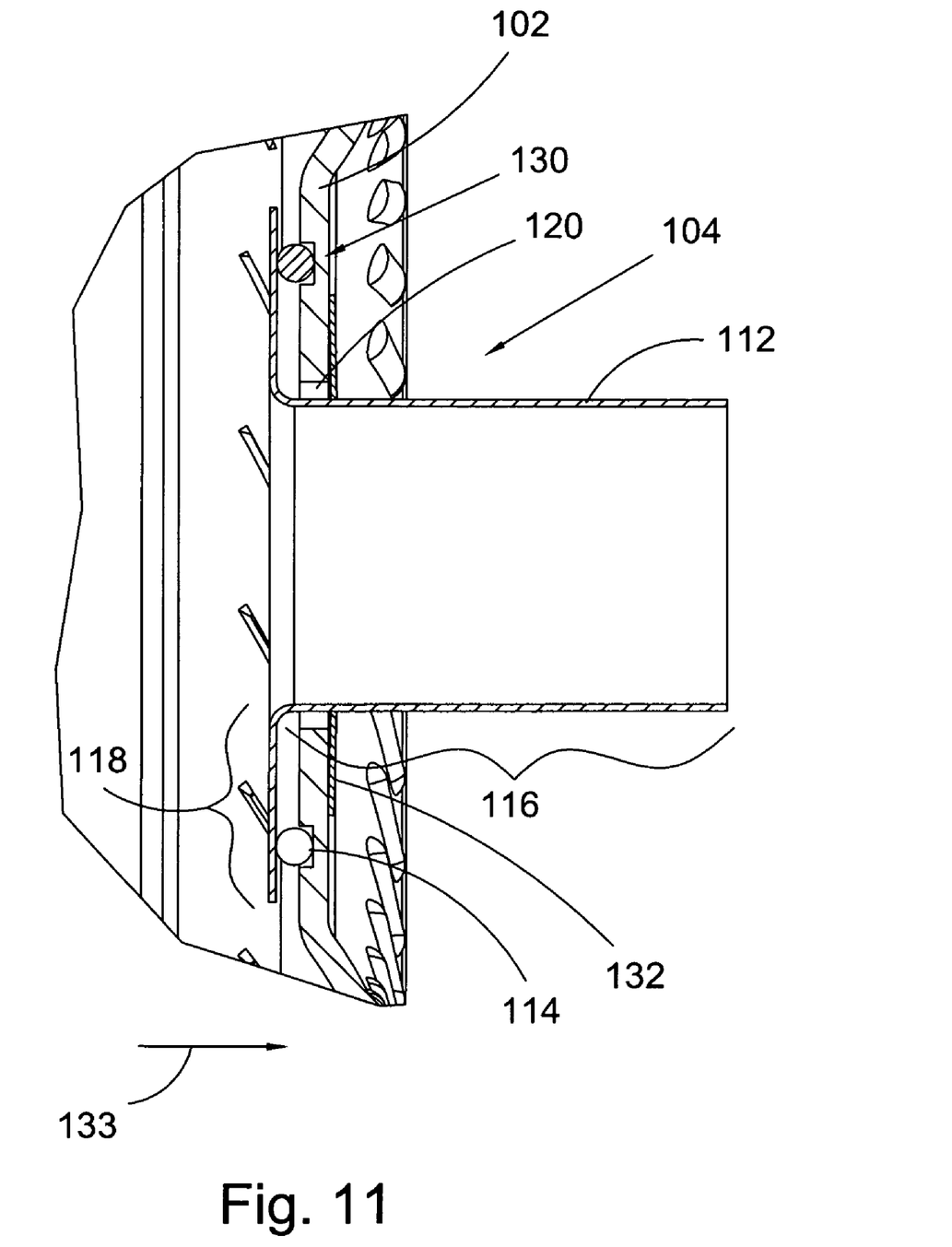

FIG. 8 is a front view of a torque converter pump of the present invention shown with the blades removed for clarity. FIG. 9 is a sectioned perspective view of the torque converter pump shown in FIG. 8. FIG. 10 is a section view of the torque converter pump shown in FIG. 8 taken generally along line 10-10 in FIG. 8. FIG. 11 is a detail view of encircled region 11 in FIG. 10. The following should be viewed in light of FIGS. 8-11.

Torque converter pump 100 includes shell 102 and hub assembly 104. Shell 102 is attached to and receives torque from a torque converter cover (not shown) as described supra. Shell 102 includes indent arrangements 106, 108, and 110 for receiving pump blades (not shown).

Hub assembly 104 includes pump hub 112 and compressible resilient element 114. By compressible resilient, we mean that the element can be compressed, but will exert a counteracting, resilient, force against the compression. Pump hub 112 includes cylindrical region 116 and annular region 118. In a preferred embodiment, cylindrical region 116 and annular region 118 are integrated into a single component. In another embodiment, regions 116 and 118 are individual components and are connected using any means known in the art (i.e., welding or brazing). In a preferred embodiment, pump hub 112 is a deep drawn stamping formed of low carbon steel. Pump hub 112 further includes means for interfacing with a hydraulic pump in a transmission (not shown). Interfacing means may be any means known in the art. In a preferred embodiment, interfacing means are slots, notches, or flattened portions (not shown) of hub 112.

Shell 102 further includes hole 120. Diameter 122 of hole 120 is larger than diameter 124 of cylindrical portion 116 of pump hub 112. Therefore, cylindrical portion 116 of pump hub 112 can pass through shell 102. Thus, hub 112 is radially displaceable with respect to the shell. Radial clearance between hole 120 and pump hub 112 compensates for misalignment between an engine (not shown) and a transmission (not shown). Diameter 126 of annular portion 118 is larger than diameter 122 of hole 120, preventing annular portion 126 from passing through hold 120 in shell 102.

Resilient element 114 is positioned between shell 102 and annular portion 118 of pump hub 112. Resilient element 114 can be any applicable element known in the art. In a preferred embodiment, resilient element 114 takes the form of a ring with a circular cross section. In another preferred embodiment, resilient element 114 is an O-ring composed of a commercially available fluorocarbon (i.e. Viton® brand fluorocarbon). Resilient element 114 may be radially located by any means known in the art. In a preferred embodiment, circumferential groove 130 in shell 102 locates resilient element 114. In another embodiment (not shown), resilient element 114 is located by a circumferential groove in or axial extension of pump hub 112.

Retaining element 132 pulls portion 118 towards shell 102, thereby compressing resilient element 114. In a preferred embodiment, retaining element 132 is a cone-shaped ring. That is, an inner diameter of the element is cone shaped. The cone shape causes the element to lock onto portion 116 once element 132 is slid onto portion 116, preventing the portion of element 132 in contact with portion 116 from sliding in direction 133. Thus, element 132 reacts against shell 102 and the reaction force is transferred to hub 104 in direction 133 by the locked connection of element 132 with portion 116. In another preferred embodiment (not shown), retaining element 132 is a speed nut. Though a retaining ring is shown, any retaining method known in the art (i.e., tabs or clips) may be employed to maintain compression on resilient element 114.

Compression of resilient element 114 between shell 102 and hub 112 creates a fluid-tight seal, preventing oil leakage. Oil pressure inside the torque converter assembly from the transmission pump or centrifugal forces further compresses resilient element 114 by forcing portion 118 toward the shell. Therefore, increased oil pressure further prevents oil leakage by applying additional compressive force to resilient element 128.

Compression of resilient element 114 enables torque transmission from shell 102 to hub 112. The amount of compression introduced by retaining means 132 is determined by the normal force required at the ring diameter to transmit torque sufficient to drive the transmission pump. Typically, operation of the transmission pump requires minimal torque (about 10 Nm), so material limits for compression of resilient element 114 can be adhered to while still driving transmission pump. Transmission of torque in this manner creates a slip-clutch that prevents torque spikes from damaging pump hub 112. That is, for torque forces up to the minimal torque noted above, the combination of hub 112 and element 114 transfers torque between the shell and the pump. For torque forces greater than the minimal torque noted above, the pump hub slips with respect to element 114 and the shell, preventing the transmission of these potentially damaging forces.

Engine and transmission misalignment and torque spikes from the transmission pump are compensated for by the inventive design. Therefore, an inventive pump hub may be thinner and less robust than typical hubs, advantageously reducing material costs and simplifying fabrication operations. In a preferred embodiment, hub 112 has no further processing after forming, thereby reducing manufacturing costs.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

I claim:

1. A pump for a torque converter, comprising:
    a shell arranged to receive a plurality of blades for said pump;
    a hub arranged to interface with a transmission;
    a single ring-shaped retaining element, separate from the shell and the hub; and
    a resilient member located axially between an annular portion of said shell and an annular portion of said hub, wherein the retaining element is for compressing the resilient member between the annular portion of the shell and the annular portion of the hub.

2. The pump of claim 1 wherein said resilient member is an O-ring.

3. The pump of claim 2 wherein said annular portion of said shell has a circumferential groove for receiving said O-ring.

4. The pump of claim 2 wherein said annular portion of said hub has a circumferential groove for receiving said O-ring.

5. The pump of claim 1 wherein said hub comprises means for rotating a hydraulic pump in said transmission.

6. The pump of claim 5 wherein said rotating means is a notch.

7. The pump of claim 5 wherein said rotating means is a flattened portion of said hub.

8. The pump of claim 1 wherein said resilient member is an O-ring and said compressing means retaining element is a speed nut.

9. A torque converter, comprising:
    a pump shell arranged to receive a plurality of blades;
    a hub arranged to interface with a transmission; and
    a frictional connection between said shell and said hub, wherein said hub is radially displaceable in relation to said pump shell.

10. The torque converter of claim 9 further comprising a cover connected to said pump shell, wherein a torque capacity of said connection between said pump shell and said cover is greater than a torque capacity of said frictional connection.

11. A method for assembling a pump hub to a pump shell comprising:
    positioning a resilient member between said pump hub and said pump shell;
    disposing a single ring-shaped retaining element about the hub; and,
    compressing, using the retaining element, said resilient member between said pump hub and said pump shell.

\* \* \* \* \*